United States Patent [19]

Malott

[11] 4,022,078
[45] May 10, 1977

[54] SHIFT CONTROL MECHANISM

[75] Inventor: Theodore A. Malott, Jackson, Mich.

[73] Assignee: Clark Equipment Company, Buchanan, Mich.

[22] Filed: Apr. 5, 1976

[21] Appl. No.: 673,503

[52] U.S. Cl. .................................. 74/475; 74/476; 74/491; 200/61.88; 335/206
[51] Int. Cl.² ...................... G05G 9/12; H01H 9/00
[58] Field of Search ................. 74/473 R, 475, 476, 74/491; 335/206; 200/61.88, 61.91

[56] References Cited

UNITED STATES PATENTS

| | | | |
|---|---|---|---|
| 1,709,169 | 4/1929 | Froesch | 74/476 |
| 2,360,496 | 10/1944 | Hill | 200/61.88 X |
| 3,106,198 | 10/1963 | Hansen | 74/473 R |
| 3,162,738 | 12/1964 | Abramson et al. | 335/206 |
| 3,177,737 | 4/1965 | Williams et al. | 74/475 X |
| 3,372,606 | 3/1968 | McGrath et al. | 74/527 X |
| 3,570,636 | 3/1971 | Franz et al. | 74/473 R X |
| 3,863,520 | 2/1975 | Moline et al. | 74/475 |
| 3,906,813 | 9/1975 | Webber | 74/473 R |

Primary Examiner—Allan D. Herrmann
Attorney, Agent, or Firm—Ernst H. Ruf

[57] ABSTRACT

A manually operable shift control mechanism operatively connected with a transmission through an electro-hydraulic control circuit for selectively establishing one of a plurality of speed ratios in the transmission, the control mechanism including a pivoted lever angularly movable between successively arranged positions for establishing one of the speed ratios in the transmission, and a detent device coacting with detent cut-outs on a control plate for releasably maintaining the lever in each of the transmission settings and affording a distinct "feel" to the operator for each transmission setting, as well as an electric circuit board on the control plate operatively interconnected with the transmission control circuit, with the circuit board being provided with a plurality of spaced electric proximity switches that are activated by a magnet means carried by a pivot arm member movable with the lever.

12 Claims, 6 Drawing Figures

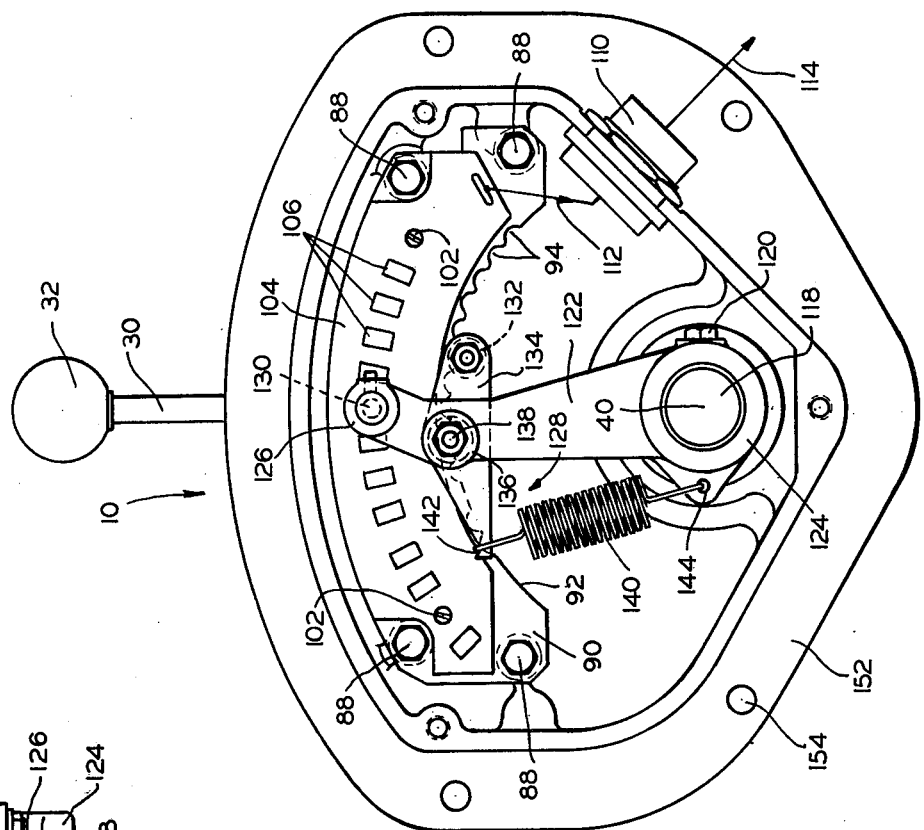
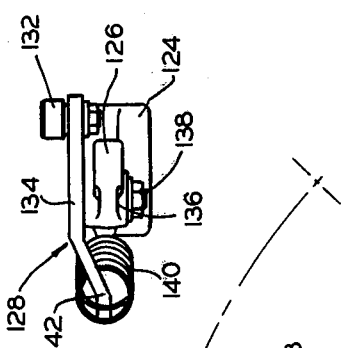
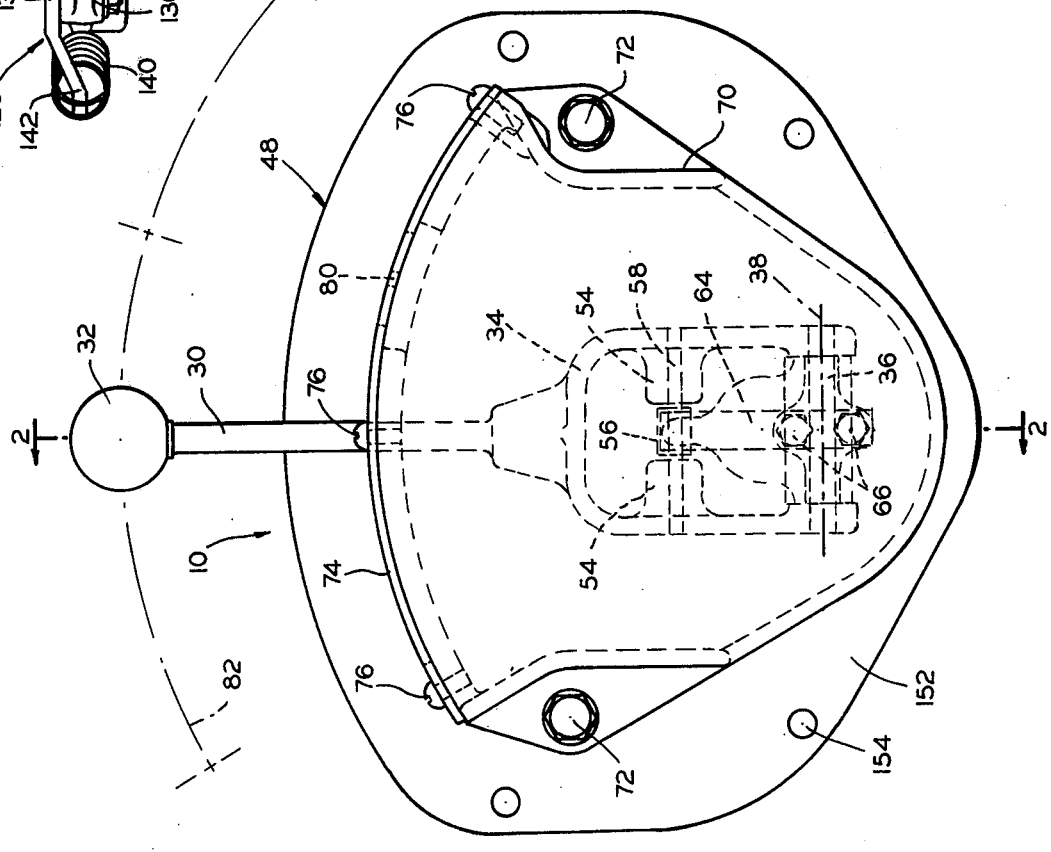

SHIFT CONTROL MECHANISM

BACKGROUND OF THE INVENTION

1. Field of the Invention

The field of art to which this invention pertains includes a manually operable shift control mechanism and more particularly a manual shift control mechanism that controls and is operatively connected with a transmission, having a multiplicity of possible speed ratios, through an electro-hydraulic control circuit.

2. Description of the Prior Art

A transmission of the type contemplated for regulation by the shift control mechanism of the present invention is described for example in U.S. Pat. No. 3,126,752 which is also assigned to the assignee of the present invention. This transmission is adapted for use in various material handling or construction type vehicles requiring a transmission with a large number of possible speed ratios in order to assure proper operation under rather widely varying conditions. As noted, the transmission is preferably regulated by a control circuit, which in turn is operable by a manual shift control mechanism of the type disclosed in the present invention.

Since the transmission is indirectly controlled by the shift control mechanism, it is preferred that the shift control mechanism afford the operator a distinct "feel" for each transmission setting. In addition, the shift gate member should be arranged so as to prevent accidental shifting into a reverse gear and to give the operator a physical indicator relative to at least the neutral setting without checking visually.

Examples of prior art patents include U.S. Pat. No. 3,106,198 to Hansen; U.S. Pat. No. 3,863,520 to Moline et al; U.S. Pat. No. 3,906,813 to Webber et al; as well as U.S. Pat. No. 3,570,636 to Franz et al.

SUMMARY OF THE INVENTION

The invention contemplates a shift control mechanism that is easily maneuverable through an uncomplicated pattern to the selected settings, that incorporates a novel arrangement for accurately and releasably maintaining each selected setting and that affords a distinct operator feel.

More particularly, the invention seeks to provide a shift control mechanism that is especially suited for operating a vehicle transmission and has a detent device directly coacting with the shift control lever for releasably maintaining the chosen settings. Additionally, the control mechanism has a unique magnetically actuated electric proximity switch arrangement closely associated therewith so as to control a plurality of electric circuits for controlling an electro-hydraulic control circuit associated with the transmission.

In summary, the shift control mechanism includes a shift control housing having a shift control lever, affixed to a clevis means, mounted relative to the housing for angular movement between a multiplicity of consecutively arranged transmission settings respectively corresponding to the transmission speed ratios. Additional mounting means permit movement of the shift control lever in a direction transverse to the angular movement. Also mounted in the housing is a control plate that has its arcuate inner surface provided with a multiplicity of consecutively arranged detent cut-outs that are spaced so as to correspond with the transmission settings. A pivot arm member, mounted on the mounting means and movable therewith, carries a detent device for releasably maintaining the control lever in positions corresponding to the transmission settings. The detent device includes a pivot plate mounted on the pivot arm member, a roller element supported thereon and a biasing element for biasing the roller element into engagement with the detent cut-outs. An electric circuit board, mounted on the control plate, is operatively connected with the transmission control circuit, with this board being provided with a plurality of spaced electric proximity switches corresponding in number and location with at least the majority of the detent cut-outs. In addition, magnet means is also provided on the pivot arm member in axial non-contacting alignment with the switches. This magnet means is adapted to be centered relative to each of the switches, by the detent device, as the pivot arm is angularly displaced relative to the circuit board via the control lever, with the switches being activated by the magnet means as it passes thereover.

The shift control mechanism is also provided with housing cover portion which includes an arcuate gate member that has a curved slot through which the control lever extends axially therethrough. Furthermore, the gate member is provided with a multiplicity of transmission setting legends corresponding to the transmission speed ratios. The legends are so angularly spaced that they correspond with the detent cut-outs and the control lever is successively aligned with the legends. The gate member also includes a stop portion that projects into the slot between the neutral and the forward settings so as to prevent the accidental shifting into the reverse settings.

Other features and advantages of this shift control mechanism will become more readily understood by persons skilled in the art when following the detailed description in conjunction with the several drawings.

BRIEF DESCRIPTION OF THE DRAWINGS

FIG. 3 is an end view taken from the left side of FIG. 2 and looking in the direction of arrows 3—3.

FIG. 4 is a sectional view taken along line 4—4 of FIG. 2 and is basically an end view from the right hand end of FIG. 2 with the end cover removed.

FIG. 5 is a top plan view of the escapement or pivot arm member of the shift control mechanism of this invention.

DESCRIPTION OF THE PREFERRED EMBODIMENT

Figure 6:
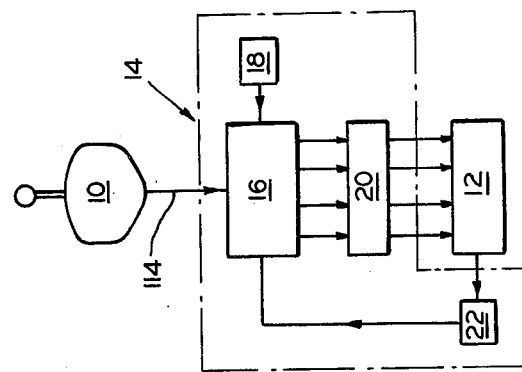
FIG. 6 is a block diagram showing of a transmission control system wherein the shift control mechanism of this invention is utilized.

Referring now to the drawings in detail, the numeral 10 denotes generally a shift control mechanism for a transmission 12 which is schematically shown in FIG. 6 and preferably takes the form of a constant-mesh power shift type of transmission described in greater detail, for example, in U.S. Pat. Nos. 3,126,752 and 3,344,679. Shift control mechanism 10 controls and is operatively connected with transmission 12 through an electro-hydraulic control circuit generally designated by the numeral 14 which, however, forms no part of the present invention. Control system 14 includes a solid state logic system 16, a power source 18 for logic system 16, an electro-hydraulic transmission interface unit 20 and a transmission output speed sensor 22.

Shift control mechanism 10 includes an angularly movable as well as transversely rockable manual shift control or selector lever 30, the outer end of which is fitted with a shift knob 32, whereas its inner end is fixedly attached to a clevis 34. The open end of clevis 34 is mounted on a pin 36 and transversely rockable about horizontal axis 38. Pin 36 in turn extends transversely through an offset portion 44 of a member 42 that is rotatably journalled, via bearings 46, relative to bore portion 50 of main housing 48 of shift control mechanism 10. Member 42 is rotatable about horizontal axis 40.

Clevis 34 also has two opposed and spaced boss portions 54 which serve to axially confine therebetween a roller 56 which is mounted on a pin 58 that extends through clevis boss portions 54. Roller 56 is adapted to normally be in contact with end face 62 of another offset or abutment portion 60 of rotatable member 42. A bias member, preferably in the form of leaf spring 64, biases roller 56 into contact with end face 62, with leaf spring 64 having its free end attached to end portion 44 of rotatable member 42 by bolts 66.

Figure 2:
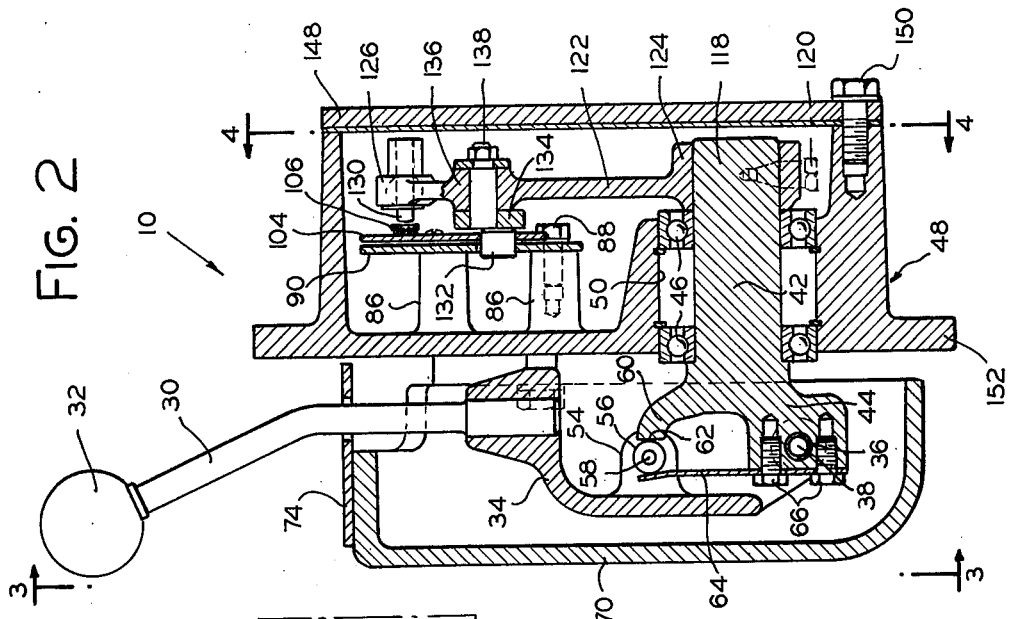
FIG. 2 is a sectional view taken generally along line 2—2 of FIG. 3.
Figure 1:
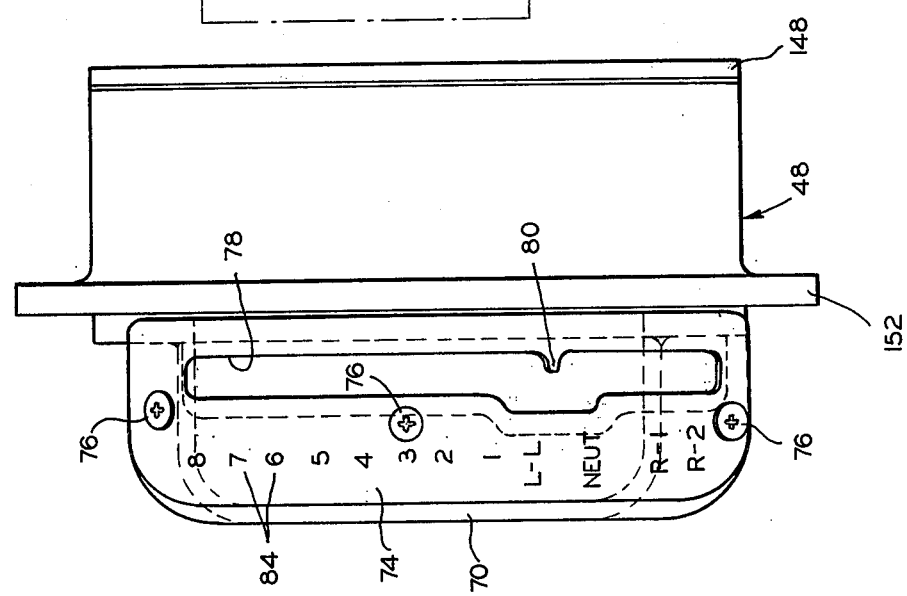
FIG. 1 is a top plan view of the housing of the shift control mechanism of this invention.

As best seen in FIGS. 2 and 3, selector lever 30 and clevis 34 are contained within housing cover portion 70 bolted to one side of main housing 48 by bolts 72. Housing cover portion 70, which is generally V-shaped in an end view, such as FIG. 3, has an open top portion which is overlaid by an arcuate gate member 74 that is attached to cover portion 70 by screws 76. Gate member 74 is provided with an arcuate slot 78 and a stop 80 for control lever 30 in order to prevent accidental shifting into a reverse gear as will be discussed in greater detail hereinafter. Gate member 74 is also provided with a plurality of transmission setting legends 84 as best seen in FIG. 1. Numerals 1 through 8 represents the forward speed settings, whereas L—L represents an extra low forward speed. NEUT represents neutral, whereas R-1 and R-2 represent two reverse speed settings. As best seen in FIGS. 2 and 3, selector lever 30 protrudes through slot 78 and is adapted to be yieldingly retained opposite one of the noted legends 84 when selector lever 30 is in the chosen position thereby indicating visually to the operator the transmission setting.

It should be understood that the shift arc or extent of angular movement 82 (FIG. 3) of selector lever 30 relative to gate member 74 is limited by the ends of arcuate slot 78. As best seen in FIG. 1, stop 80 projects into slot 78 just above the neutral legend so that shifting into neutral requires the operator to rock selector lever 30 and consequently clevis 38 above horizontal axis 38 in a counter-clockwise direction. This rocking movement, which can be visualized by viewing FIG. 2, is opposed by spring 64 that provides a desired resistance or operator feel so that the operator has to make a conscious movement to shift into neutral position, with this conscious movement preventing accidental shifting into a reverse gear directly from a forward gear. Stop 80 also acts to give the operator a physical indicator relative to the L—L and NEUT settings, thus making it possible to find these settings without checking visually.

As best seen in FIGS. 2 and 4, rigidly attached to boss portions 86 of main housing 48, by bolts 88, is an arcuate control plate 90 whose inner arcuate surface 92 is provided with a plurality of detend cut-outs 94 corresponding in number with the transmission plurality shift legends provided on gate member 74, with detent cut-outs 94 being spaced about 6° apart.

Physically attached to one side of control plate 90, by screws 102, is an arcuate printed circuit board 104 which has mounted thereon a plurality of "Hall effect" electric proximity switches 106 which may, for example, take the form of Series SS Magnetically Operated Solid State Switches manufactured by the Micro Switch Division of Honeywell Inc. in Freeport, Illinois. Switches 106 are mounted on circuit board 104 in a manner so as to have substantially similar spacings therebetween that correspond with the spacing of detent cut-outs 94 and all the, or at least a substantial number, transmission shift legends on gate member 74. Switches 106 are operatively connected with circuit board 104, with the latter also being electrically connected with receptable 110 via schematically shown wiring 112. Receptacle 110 is electrically connected via schematic wiring 114 with solid state logic system 16 (FIG. 6) of electro-hydraulic control circuit 14, with the latter forming no part of the present invention.

Physically attached to an outer end 118 of rotatable member 42, by set screw 120, is inner end portion 124 of pivot arm member 122, with pivot arm member 122 thus being rotatable or angularly movable about axis 40 with selector lever 30.

Pivot arm outer end portion 126 carries a magnet 130 that is adapted to be centered relative to each of proximity switches 106 as pivot arm member 122 is angularly displaced relative to circuit board 104 via the action of selector lever 30. Switches 106 are magnetically activated by magnet 130 as the magnet passes thereover. As best seen in FIG. 2, the outer end of magnet 130 is axially slightly spaced from the outer surface of switches 106.

The centering of magnet 130 relative to each of proximity switches 106 is controlled by a detent device viewed generally at 128 (FIG. 5) which employs a rotatable cylindrical cam follower or roller element 132 which is secured to one end of a pivot plate 134 which in turn is pivotally secured near its center on an intermediate portion 136 of pivot arm member 122 by means of shoulder bolt 138 that is formed integral with the pivot plate.

As best seen in FIGS. 2 and 4, cam follower 132 is adapted to be received in detend cut-outs 94. For bias, an extension spring 140 is arranged so as to have one end attached at 142 to pivot plate 134 and an opposite end attached at 144 to pivot arm portion 124. As a result, spring 140 will urge pivot plate 134 in a counter-clockwise direction about bolt 138 (as viewed in FIG. 4) so that, as selector lever 30 is pivoted, cam follower or roller 132 will move along arcuate inner surface 92 of control plate 90 into and out of detent cut-outs 94 thereby affording a distinct feel to the operator for each transmission setting. As previously noted, the ends of slot 78 of gate member 74 limit the angular movement of selector lever 30 such that cam follower 132 cannot be pivoted in either direction far enough to move it out of engagement with detent cut-outs 94. Thus, pivot plate 134 biases cam follower 132 into progressive engagement with detent cut-outs 94, with detents 94 being so spaced relative to proximity switches 106 that, whenever cam follower 132 is received in a detent cut-out 94, magnet 130 is centered relative to one of switches 106.

The outer end of main housing 48 is closed off by means of end cover 48 attached thereto by bolts 150. Main housing 48 is also provided with a generally radially extending flange portion 152 at the inner end thereof, with flange portion 152 being provided with a plurality of apertures 154 for attachment purposes.

It should, of course, be understood that shift control mechanism 10 is mounted within easy reach of the operator at an operator control station (not shown) in any desired position.

From the foregoing, it is believed that those familiar with the art will recognize and appreciate the novel concepts and features of this transmission control system. Obviously, while the invention has been described in relation to only a single preferred embodiment, numerous variations, changes and substitutions of equivalents will present themselves to persons skilled in the art and may be made without necessarily departing from the scope and priniciples of this invention. Consequently, the scope of this invention should be determined solely by reference to the claims appended hereto.

What is claimed is:

1. In a vehicle shift control mechanism of a character adapted for installation at an operator control station for regulating a transmission control circuit, the combination of:
   a. a shift control housing;
   b. a shift control lever;
   c. first means for mounting said lever in said housing for angular movement between a plurality of consecutively arranged transmission settings respectively corresponding to the transmission speed ratios, said mounting means also serving for mounting a pivot arm member spaced from said angularly movable with said lever;
   d. a control plate mounted in said housing, said control plate having an arcuate surface that is provided with a plurality of spaced detent cut-outs, corresponding to each of said transmission setting;
   e. a biaset detend device for releasably maintaining said lever in each of said transmission settings, thereby affording a distinct "feel" to the operator for each transmission setting;
   f. an electric circuit board mounted on said control plate and operatively interconnected with said transmission control circuit, said circuit board being provided with a plurality of spaced electric proximity switches corresponding to at least a substantial number of said transmission settings as well as each of said detent cut-outs; and
   g. magnet means, provided on said pivot arm member, in axial non-contacting alignment with said switches, said magnet means being adapted to be centered relative to each of said switches, by said detent device, as said pivot member is angularly displaced relative to said circuit board via the action of said lever, with said switches being activated by said magnet means as it passes thereover.

2. The shift control mechanism of claim 1 wherein said detent device includes a pivot plate pivotally mounted on said pivot arm member, a roller element rotatably supported on said pivot plate adjacent said control plate arcuate surface, and a biasing element for biasing said roller element into engagement with successive ones of said detent cut-outs.

3. The shift control mechansim of claim 1 further including a housing cover portion attached to one of said housing, said cover portion having an open top portion which is overlayed by a gate member having an arcuate slot through which a portion of said lever extends radially therethrough.

4. The shift control mechanism of claim 3 wherein said gate member is provided with a plurality of transmission setting legends corresponding to the transmission speed ratios, said legends being so spaced as to correspond with said detent cut-outs so that said lever is successively radially aligned with one of said legends.

5. The shift control mechanism of claim 4 wherein said legends include a neutral as well as at least one forward and reverse setting, and said gate member includes a stop portion that projects into said slot between said neutral and said at least one forward setting, said stop portion preventing the accidental shifting into said at least one reverse setting.

6. The shift control mechanism of claim 5 further including second means for mounting said lever for pivotal movement transverse to said angular movement, said second means for mounting being utilized in conjunction with said first means for mounting for moving said lever past said stop portion.

7. A manually operable shift control mechanism for selectively establishing one of a multiplicity of speed ratios in a transmission, the combination comprising:
   a. a shift control housing;
   b. a shift control lever;
   c. clevis means attached to an inner end of said lever;
   d. means for mounting the open end of said clevis means on said housing for angular movement between a multiplicity of consecutively arranged transmission settings respectively corresponding to said transmission speed ratios, and additional means for mounting the open end of said clevis means on said mounting means for pivotable movement in a direction transverse to said angular movement;
   e. control plate mounted on said housing and having an arcuate inner surface provided with a multiplicity of consecutively arranged detent cut-outs that are spaced so as to correspond with said transmission settings;
   f. a pivot arm member mounted on said mounting means and adapted to be angularly movable with said clevis means;
   g. a detent device for releasably maintaining said control lever in positions corresponding with said transmission settings, said detent device including a pivot plate pivotally mounted on said pivot arm member, a follower rotatably mounted on one end of said pivot plate in alignment with said detent cut-outs and a biasing element, interposed between another end of said pivot plate and said pivot arm, for biasing said follower into selective engagement with said detent cut-outs, thereby affording a distinct feel to an operator for each transmission setting;
   h. an electric circuit board attached to one side of said control plate and operatively connected with said transmission, said board being provided with a multiplicity of electric proximity switches corresponding in number and location with at least the majority of said detent cut-outs; and
   i. magnet means, for selectively activating said switches, attached to said pivot arm member in close axial proximity with said switches, said magnet means being angularly movable with said pivot arm and adapted to be selectively centered relative to said switches when said follower is engaged with said detent cut-outs.

8. The shift control mechanism of claim 7 wherein said mounting means includes a rotatable member having an abutment portion; said clevis means includes a roller member mounted thereof; and additional biasing means mounted on said rotatable member and in contact with said roller member for biasing said clevis into yieldable engagement with said rotatable member abutment portion.

9. The shift control mechanism of claim 7 wherein said magnet means is angularly aligned with said shift control lever.

10. The shift control mechanism of claim 7 further including a housing cover portion attached to one side of said housing and enclosing said clevis means, said cover portion having an open top portion which is overlayed by an arcuate gate member having a curved slot through which said lever extends radially therethrough.

11. The shift control mechanism of claim 10 wherein said gate member is provided with a multiplicity of transmission setting legends corresponding to the transmission speed ratios, said legends being so angularly spaced as to correspond with said detent cut-outs so that said lever is successively aligned with said legends.

12. The shift control mechanism of claim 10 wherein said housing includes a generally radially outwardly extending flange portion adjacent to said housing cover portion, said flange portion being provided with a plurality of apertures adapted to be used for attachment purposes at an operator control station.

* * * * *